(12) United States Patent
Bershad et al.

(10) Patent No.: US 7,480,377 B2
(45) Date of Patent: Jan. 20, 2009

(54) DUAL ADAPTIVE FILTER APPARATUS AND METHOD

(75) Inventors: Neil J. Bershad, Newport Beach, CA (US); Anurag Bist, Newport Beach, CA (US)

(73) Assignee: Intel Corporation, Santa Clara, CA (US)

( * ) Notice: Subject to any disclaimer, the term of this patent is extended or adjusted under 35 U.S.C. 154(b) by 826 days.

(21) Appl. No.: 10/749,987

(22) Filed: Dec. 31, 2003

(65) Prior Publication Data

US 2005/0147230 A1    Jul. 7, 2005

(51) Int. Cl.
*H04M 1/00* (2006.01)

(52) U.S. Cl. ............................. 379/406.01; 379/406.02; 379/406.03; 379/406.04; 379/406.05; 379/406.06; 379/406.07; 379/406.08; 379/406.09; 379/406.1; 379/406.11; 379/406.12; 379/406.13; 379/406.14; 379/406.15; 379/406.16; 370/286; 381/71.11; 381/71.8

(58) Field of Classification Search ................ 379/406.01–406.16, 370.02; 381/71.11, 381/71.8; 370/286
See application file for complete search history.

(56) References Cited

U.S. PATENT DOCUMENTS

| | | | | |
|---|---|---|---|---|
| 4,903,247 A | * | 2/1990 | Van Gerwen et al. | 367/135 |
| 4,951,269 A | * | 8/1990 | Amano et al. | 367/135 |
| 5,953,410 A |   | 9/1999 | Pfeil et al. | |
| 6,035,033 A |   | 3/2000 | Von Pfeil et al. | |
| 6,590,975 B1 |   | 7/2003 | Ariyama | |
| 6,606,382 B2 |   | 8/2003 | Gupta | |
| 2002/0093919 A1 | * | 7/2002 | Bershad et al. | 370/286 |

OTHER PUBLICATIONS

Rapid Identification of a Sparse Impulse Response Using an Adaptive Algorithm in the Haar Domain. IEEE Trans. on Signal Processing, vol. 51, No. 3, pp. 628-638, Mar. 2003.*
Hosur et al, "Wavelet Transform Domain Adaptive FIR Filtering".*
Bershad, Neil J., et al., "On the Probability Density Function of the LMS Adaptive Filter Weights", *IEEE Transactions on Acoustics, Speech, and Signal Processing*, vol. 37, Issue 1, (Jan. 1989), pp. 43-56.
Breining, Christina, et al., "Acoustic Echo Control, An Application of Very-High-Order Adaptive Filters", *IEEE Signal Processing Magazine 1053-5888/99*, (Jul. 1999), pp. 42-69.
Doroslovacki, Milos, et al., "On-Line Identification of Echo-Path Impulse Responses by Haar-Wavelet-Based Adapative Filter", *IEEE 0-7803-2431-5/95*, (1995), pp. 1065-1068.
Duttweiler, Donald L., "Subsampling to Estimate Delay with Application to Echo Cancelling", *IEEE Transactions on Acoustics, Speech and Signal Processing*, vol. ASSP-31, No. 5, (Oct. 1983), pp. 1090-1099.

(Continued)

*Primary Examiner*—Quynh H Nguyen
(74) *Attorney, Agent, or Firm*—Blakely, Sokoloff, Taylor & Zafman LLP

(57) ABSTRACT

A method and apparatus for adapting dual filters is disclosed. In one aspect, a method may include transforming a signal, adapting a first adaptive filter based on the transformed signal, estimating a delay of an impulse response based on the adaptation of the first filter, delaying a signal based on the estimated delay, and adapting a second adaptive filter based on the delayed signal. In one aspect, an echo or other unwanted signal may be reduced or cancelled based on the adaptation of the second filter.

27 Claims, 4 Drawing Sheets

OTHER PUBLICATIONS

Fisher, Ben, et al., "The complex LMS adaptive algorithm—Transient weight mean and covariance with applications to the ALE", *IEEE Transactions on Acoustics, Speech, and Signal Processing*, vol. 31, Issue 1, (Feb. 1983), pp. 34-44.

Gardner, William A., "Nonstationary Learning Characteristics of the LMS Algorithm", *IEEE Transactions on Circuits and Systems*, vol. 34, Issue 10, (Oct. 1987), pp. 1199-1207.

Horowitz, Larry L., et al., "Performance advantage of complex LMS for controlling narrow-band adaptive arrays", *IEEE Transactions on Acoustics, Speech, and Signal Processing*, vol. ASSP-29, No. 3, (Jun. 1981), pp. 722-736.

Hosur, Srinath, et al., "Wavelet Transform Domain Adaptive FIR Filtering", *IEEE Transactions on Signal Processing*, vol. 45, No. 3, (Mar. 1997), pp. 617-630.

International Telecommunication Union, "Digital Network Echo Cancellers", *ITU-T Recommendation G.168*, (Jun. 2002), 108 pages.

Kellerman, W., Guest Editor, "Special Section on Current Topics in Adaptive Filtering for Hands-Free Acoustic Communication and Beyond," Signal Processing (EURISIP), vol. 80, No. 9, pp. 1695-1696, Sep. 2002.

\* cited by examiner

DUAL ADAPTIVE FILTER APPARATUS AND METHOD

BACKGROUND

A problem in many communication systems is the formation of echos. Echo cancellers have traditionally been employed to cancel the echos.

There are two principle types of echo cancellers, the network echo canceller, and the acoustic echo canceller. Network echo cancellers, which are also known in the arts as line echo cancellers, may cancel echos on networks, such as the Public Switched Telephone Network (PSTN). Echos may occur in such networks due to 2-wire/4-wire conversions and other impedance mismatches. Acoustic echo cancellers may cancel echos resulting from feedback or singing between speakers and microphones. Such echos may occur in cell phones, other portable radio communication devices, teleconferencing equipment, and in hands-free mobile telephony devices.

At least conceptually, both network and acoustic echo cancellers may operate on the principle "to remove an echo, subtract it". The echo canceller may model and estimate the echo, often with the use of an adaptive filter, and then subtract the estimated echo from an actual echo that is resident in the outgoing transmission signal. Reducing the echo may improve the quality of the data or speech that is exchanged over the communication link.

One problem that may present itself in the field of echo cancellation is sparseness of a channel. The term sparseness may imply that the initial delay uncertainty of the impulse response is much longer than the impulse response itself.

FIG. 1 shows an example of a sparse impulse response that may be observed in an echo path. The amplitude of the impulse response is plotted on the y-axis and progression of time is plotted on the x-axis. As shown, there may be a relatively large and uncertain initial delay prior to the impulse response. During this initial delay, the amplitude remains essentially zero. Then, the impulse response may occur. The amplitude of the impulse response may initially achieve a peak value, and then gradually dissipate over time, until the amplitude again becomes zero. The duration of the impulse response is sometimes referred to in the arts as the dispersive region. It is the dispersive region that may contain the information of most relevance for adapting filter coefficients of echo cancellers.

In a sparse channel, the initial delay may last for a much longer period of time than the dispersive region. As one example, the initial delay may last on the order of 128 milliseconds (msec), while the dispersive region may last in the range of 4-20 msec. Traditionally, unnecessarily long filter lengths have been employed in echo cancellation in order to accommodate for the initial delay. However, a significant number of the filter coefficients or taps that correspond in time to the initial delay may have values that are essentially zero or otherwise non-contributing. In the case of a 128 msec delay line, with an 8 kh sampling rate, a majority of 1024 coefficients may essentially be zero. For example, only about 100-200 of the coefficients may be significant.

Now, there are a number of potential drawbacks to employing such long adaptive filters. One drawback is that the filters may be slow to adapt. The speed at which the filters adapt may be inversely proportional to, or at least inversely related to, the number of adaptable filter coefficients. Slower convergence may adversely affect the quality of the data. Other drawbacks are that significant computation may be needed to adapt a long filter and significant memory may be needed to store the coefficients. Yet another drawback is that the coefficients may have noisy weights. The noise of the adaptive coefficients may be proportional to, or at least related to, the number of adaptable filter coefficients. Likewise, there are a number of potential advantages to reducing the filter length. The potential advantages may include faster convergence, less noise, and an overall reduction in the memory to store the coefficients and the amount of computation to adapt the coefficients.

There has heretofore been much effort to reduce the length of the adaptive filters employed in echo cancellers, while still allowing relatively long initial and uncertain delays. Various efforts are discussed in the following references:

(1) D. L. Duttweiler, "Subsampling to Estimate Delay with Application to Echo Canceling" *IEEE Trans. on Acoustics, Speech and Signal Processing*, Vol. ASSP-31, No. 5, pp. 1090-1099, October 1983.

(2) S. Hosur and A. H. Tewfik, "Wavelet Transform Domain Adaptive FIR Filtering," *IEEE Trans. on Signal Processing*, Vol. 45, No. 3, pp. 617-629, March 1997.

(3) M. Doroslovacki and H. Fan, "On-line Identification of Echo-path Impulse Responses by Haar-Wavelet-Based Adaptive Filter", *Proc. IEEE Conf. on Acoustics, Speech and Signal Processing*, pp. 1065-1068, 1995.

(4) K. C. Ho and S. D. Blunt, "Rapid Identification of a Sparse Impulse Response Using an Adaptive Algorithm in the Haar Domain" *IEEE Trans. on Signal Processing*, Vol. 51, No. 3, pp. 628-638, March 2003.

The inventors have developed new and useful methods and apparatus that they hope will greatly advance the arts of modeling sparse impulse responses and canceling echos.

BRIEF DESCRIPTION OF THE SEVERAL VIEWS OF THE DRAWINGS

The invention may best be understood by referring to the following description and accompanying drawings that are used to illustrate embodiments of the invention. In the drawings.

DETAILED DESCRIPTION

The inventors have discovered new and useful apparatus and methods that they hope will greatly advance the arts of adapting filters for echo cancellation and other applications. In the following description, numerous specific details are set forth. However, it is understood that embodiments of the invention may be practiced without these specific details. In other instances, well-known circuits, structures and techniques have not been shown in detail in order not to obscure the understanding of this description.

Figure 1:
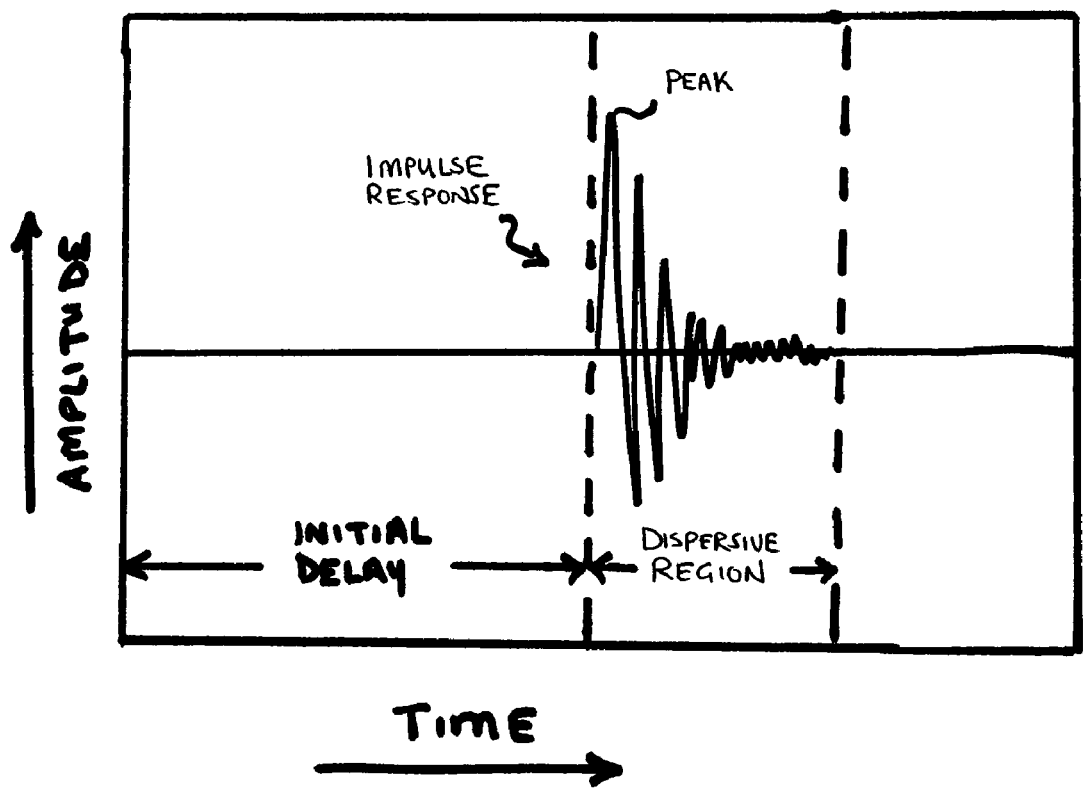
FIG. 1 shows an example of a sparse impulse response in an echo path.
Figure 2:
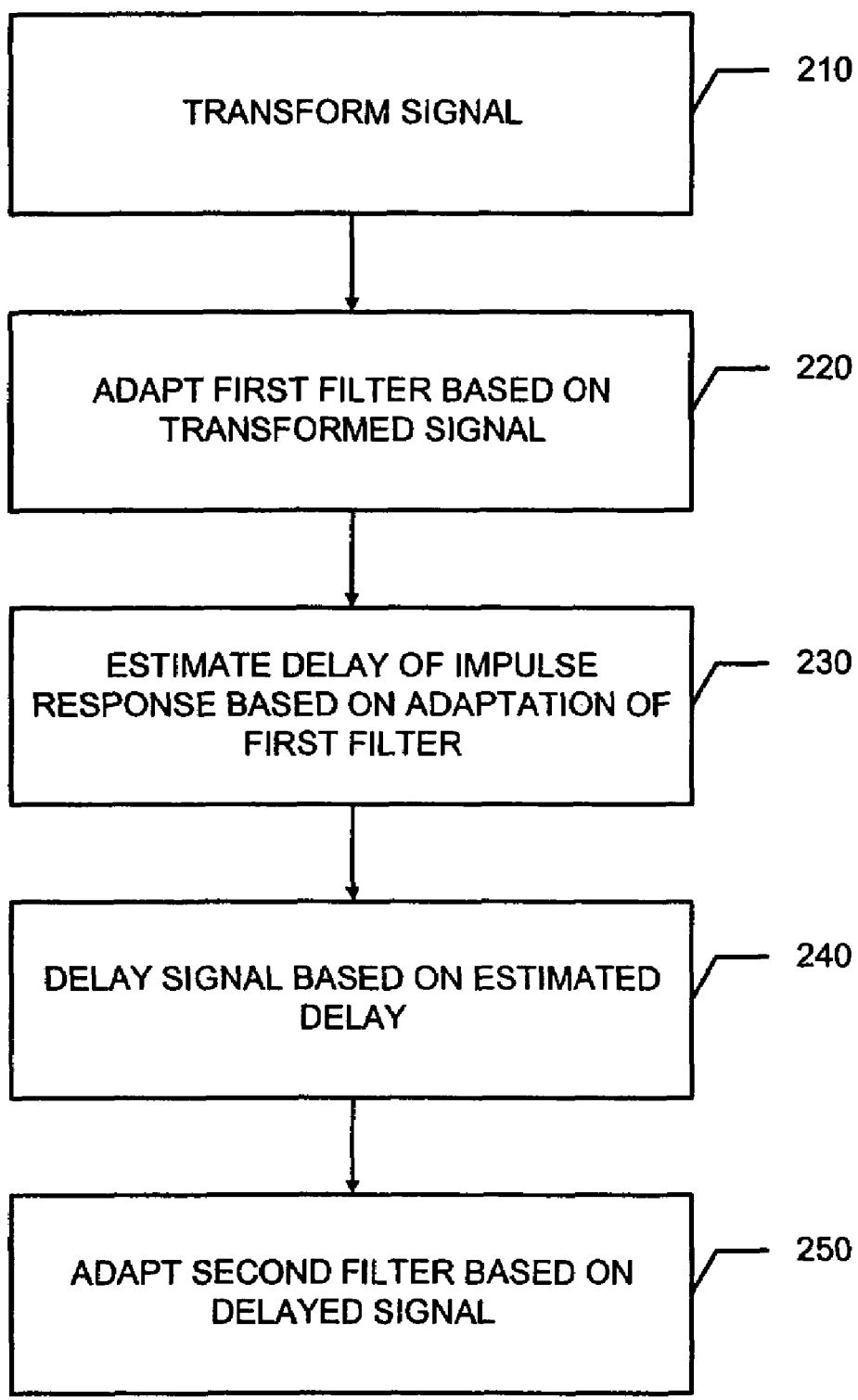
FIG. 2 shows a method of adapting filters, according to one embodiment of the invention.

FIG. 2 shows a method of adapting filters, according to one embodiment of the invention. The method includes transforming a signal, at block 210. In one embodiment of the invention, a partial Haar transform may be employed. A partial Haar transform may represent a transform that uses only a subset of the complete basis functions of a full Haar transform. Alternatively, other full or partial wavelet transforms known in the signal processing arts may be employed.

Then, a first filter may be adapted based on the transformed signal, at block 220. Complete adaptation or convergence is not required. The inventors have discovered that a reasonable estimate of the peak of the impulse response may be obtained well before the first filter has converged. Significant memory and computational savings may potentially be achieved by stopping the adaptation of the first filter prior to convergence.

Next, a delay associated with an unknown impulse response, may be estimated based on the adaptation of the first filter, at block 230. In various embodiments of the invention, the delay may include a delay of a peak, extremity, or other portion of the impulse response. In one aspect, the delay may be estimated based on the values of one or more adapted, but not necessarily completely adapted, filter coefficients. For example, estimating the delay may include identifying a filter coefficient with the largest absolute value, or the largest squared value.

Then, a reception signal may be delayed based on the estimated delay, at block 240. In various embodiments of the invention, a buffer, delay line, or other temporary storage device may be employed to delay the reception signal.

Next, a second filter may be adapted based on at least a portion of the delayed signal, at block 250. In one embodiment of the invention, the second adaptive filter may include a relatively short filter that is be substantially centered about the estimated delay of the peak of the impulse response. The inventors have discovered that such positioning, alignment, or centering of the second filter about the estimated delay may allow a significantly shorter second filter to be employed, especially in the case of a sparse channel. This may help to significantly reduce the memory and computation used to adapt the filter. This may also significantly increase the convergence speed, which may help to improve echo cancellation.

To summarize so far, two adaptive filters may be adapted in series. The first adaptive filter may be adapted on a transformed signal, and a delay associated with the impulse response may be estimated based on the adaptation. Then, the second adaptive filter may be substantially centered or otherwise positioned about the estimated delay and may be adapted on a delayed signal.

The inventors have discovered that significant reductions of memory and computation may potentially be realized by this method. The estimate of the delay normally does not require great accuracy. The transform of the signal may allow adaptation with sufficient sensitivity and resolution to estimate the delay, while helping to reduce the number of coefficients of the first filter. This may significantly reduce the amount of memory and computation. In the case of a partial Haar filter, the resolution and the amount of memory and computation may be customized for a particular implementation.

Also, the estimate of the delay may allow a shorter second filter to be employed. The second filter may not need to contain a large number of coefficients to span the entire uncertain time period over which the impulse response may occur. Instead, once the estimate of the delay is available, the second filter may be substantially centered about the estimate of the delay. In this way, the number of coefficients of the second filter may be substantially reduced. In one aspect, the second filter may have about as many coefficients as are needed to model an impulse response with a known delay. Accordingly, a potential advantage of the approach is that two relatively short filters may be employed instead of one or more relatively longer filters, which may allow faster convergence, and reduced computation and memory.

The method disclosed above may be used for various purposes in the signal processing and filtering arts. In one embodiment of the invention, the method may be used to cancel or at least reduce an echo based on the adaptation of the second filter. In other embodiments of the invention the method may be used to model impulse response of channels, and especially sparse channels, for other purposes, such as for sonar beam forming. Further concepts will be illustrated through an embodiment of an echo canceller, although the invention is not so limited.

Figure 3:
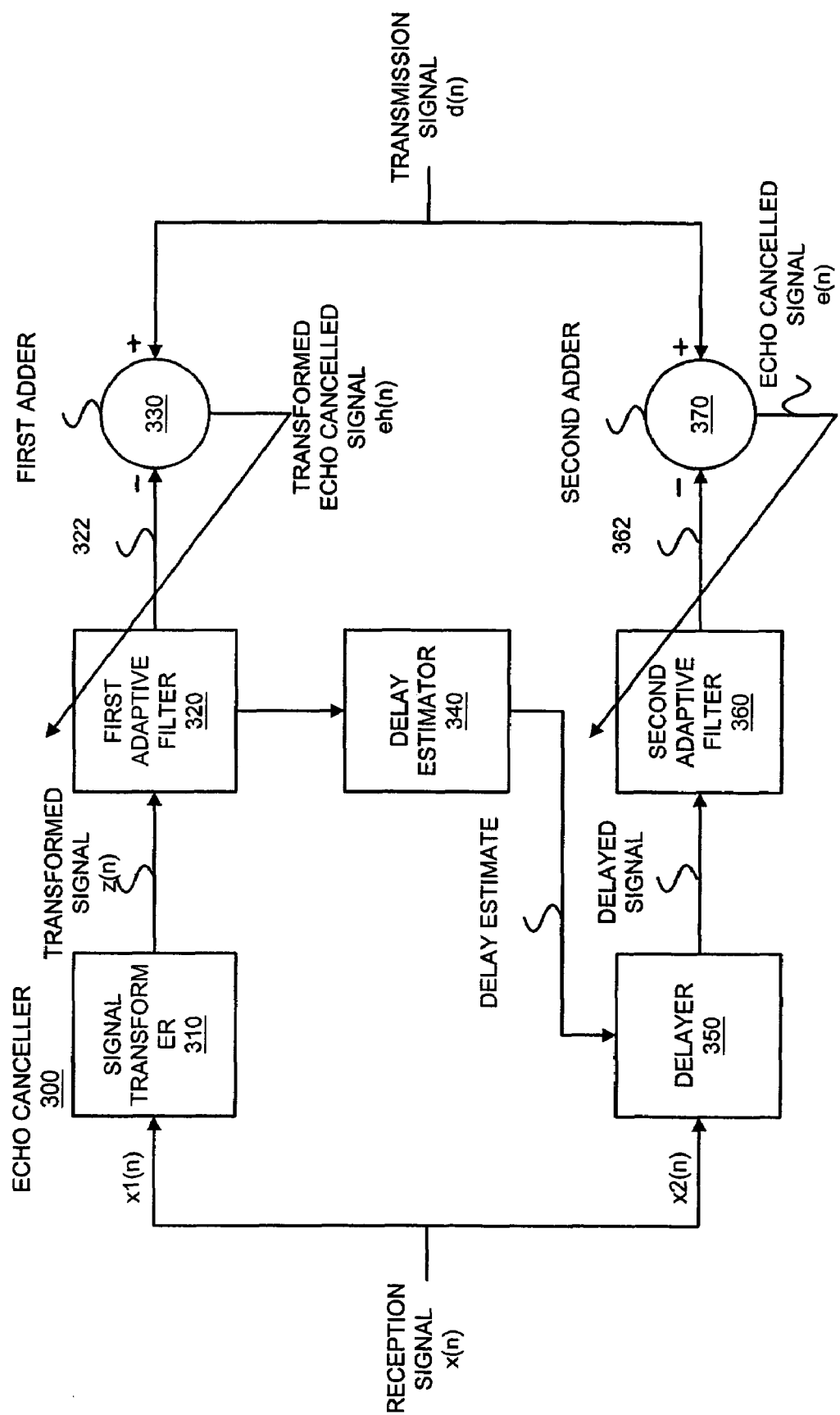
FIG. 3 shows an echo canceller, according to one embodiment of the invention.

FIG. 3 shows an echo canceller 300, according to one embodiment of the invention. As used herein, the term "echo canceller" refers to an apparatus that may cancel, or at least reduce, an echo. The echo may include a network echo, or an acoustic echo, for example. The illustrated echo canceller includes a signal transformer 310, a first adaptive filter 320, a first adder 330, a delay estimator 340, a delayer 350, a second adaptive filter 360, and a second adder 370. In one aspect, the signal transformer, the adaptive filters, the adders, and the delay estimators may include software components or modules and the delayer may include a hardware component or module, although this is not required. In other aspects, any of these components may include hardware, software, firmware, or some combination.

The echo canceller may receive a reception signal, x(n). In the field of echo cancellation, the reception signal is also known as the far end signal. In one embodiment of the invention, the reception signal may include speech or other acoustic data, for example associated with telephony. For example, the reception signal may include voice-over-packet data. However, the invention is not limited to such exemplary reception signals.

The echo canceller may replicate, multiply, copy, divide, split, or otherwise derive or produce a plurality of signals from the original reception signal. There is no requirement that the derived or produced signals be identical to the original reception signal, although it will often be appropriate if the derived or produced signals have substantially the same impulse response characteristics as the original reception signal.

A first signal $x_1(n)$ of the plurality may be provided to the signal transformer 310, and a second signal $x_2(n)$ of the plurality may be provided to the delayer 350. First, the processing of the signal that is provided to the signal transformer will be discussed, and then the processing of the signal that is provided to the delayer will be discussed.

The signal transformer 310 may receive the first signal $x_1(n)$ and transform the first signal using a signal transform. In one embodiment of the invention, the signal transformer may employ a partial Haar transform. Alternatively, a full Haar transform or other partial or full wavelet transforms known in the signal processing arts may optionally be employed.

Haar transforms will be discussed first, and then partial Haar transforms will be discussed. Haar transforms are well known in the signal processing arts, as demonstrated by the Doroslovacki et al. and Ho et al. references mentioned in the background section. A short review should suffice. Haar transforms are based on wavelets. The Haar wavelets are discrete-time orthonormal sequences defined by the relations:

$$\psi_{mn}(t) = \psi_{m0}(t - 2^m n) \qquad (1)$$

where $$\psi_{m0}(t) = 2^{-m/2}, \text{ for } 0 \le t \le 2^{m-1} - 1, \qquad (2)$$
$$= -2^{-m/2}, \text{ for } 2^{m-1} \le t \le 2^m - 1,$$
$$= 0 \text{ otherwise}$$

The indices m and n may correspond to scale and translation, respectively. The index m may represent a natural number that is assumed to go from 1 to M, and the index n may represent an integer. The Haar transform may be represented as an N×N orthogonal matrix, $H_M$, where $N=2^M$. As an example, when M=3:

$$H_3 = 2^{-3/2} \times \begin{bmatrix} 1 & 1 & 1 & 1 & 1 & 1 & 1 & 1 \\ 1 & 1 & 1 & 1 & -1 & -1 & -1 & -1 \\ \sqrt{2} & \sqrt{2} & -\sqrt{2} & -\sqrt{2} & 0 & 0 & 0 & 0 \\ 0 & 0 & 0 & 0 & \sqrt{2} & \sqrt{2} & -\sqrt{2} & -\sqrt{2} \\ 2 & -2 & 0 & 0 & 0 & 0 & 0 & 0 \\ 0 & 0 & 2 & -2 & 0 & 0 & 0 & 0 \\ 0 & 0 & 0 & 0 & 2 & -2 & 0 & 0 \\ 0 & 0 & 0 & 0 & 0 & 0 & 2 & -2 \end{bmatrix} \quad (3)$$

The first basis vector (the first row) may measure the average value of the input vector. The second basis vector (the second row) may measure a low frequency component of the input vector. The next two basis vectors (the third and fourth rows) may be sensitive to the first and the second half of the input vector, corresponding to moderate frequency components. The remaining four basis vectors (the fifth through the eighth rows) may be sensitive to the four quarters of the input vector, corresponding to high frequency components. Notice that the first and the second row vectors each individually span the full time axis, domain or range of the uncertain time period over which the impulse response may occur, that the third and fourth row vectors together span the full time range, and that the fifth through the eighth row vectors together span the full time range. Finer time resolution may imply that more basis vectors may be used to span the full time range.

Now, the full Haar transform may be employed to provide an accurate representation of the impulse response. However, the use of a full Haar transform often does not provide significant reduction in memory or computation as compared to directly adapting on the untransformed reception signal, x(n). The inventors have found that often a partial Haar transform may be appropriate in order to help reduce the amount of memory and computation used for the implementation.

As used herein, the term partial Haar transform refers to a transform that includes only a portion or subset of a full Haar transform. Just as the Haar transform is wavelet transform, the partial Haar transform is a partial wavelet transform. As used herein, the term wavelet transform includes both full and partial wavelet transforms.

In one embodiment of the invention, the partial Haar transform may include a portion or subset of the complete orthonormal set of basis vectors of a full Haar transform. The choice of the subset of the basis vectors of the partial Haar transform may depend upon the number of adaptive coefficients desired for the first adaptive filter. In general, the dimensionality of the subset may determine the number of coefficients of the first filter. The subset may span the full time range in order to better locate the peak of unknown channel impulse response. The portion or subset of the basis vectors may span the entire time range or domain of the full Haar transform so that the impulse response may be located over the entire time span.

Referring again to Equation (3), for $H_3$, it is seen that the bottom four rows collectively span the entire time range or domain. Likewise, the third and the fourth rows collectively span the entire time domain or range. The first and the second rows individually each span the entire time domain or range. The bottom four rows may provide the best time resolution, followed by the third and the fourth rows, followed by the second row, and finally by the top row. Better time resolution may allow more accurate estimate of the delay of the impulse response or echo. However, more resolution may also imply that more coefficients are needed in the first adaptive filter. The bottom four rows may utilize four adaptive coefficients, one for each row. The third and the fourth rows may utilize two adaptive coefficients. The first and the second rows may each utilize one coefficient. Accordingly, the number of needed adaptive coefficients may be related to the size of set needed to span the full time range. Thus, the wavelet [2 −2] may have $$\frac{8}{2} = 4$$

members, the wavelet $[\sqrt{2} \ \sqrt{2} \ -\sqrt{2} \ -\sqrt{2}]$ may have $$\frac{8}{4} = 2$$

members, and the wavelets [1 1 1 1 −1 −1 −1 −1] and [1 1 1 1 1 1 1 1] may each have $$\frac{8}{8} = 1$$

member.

Often in practice, much larger data block lengths may be employed. Consider extending these ideas to the case when the data block length is 1024. Thus, $M=\log_2(1024)=10$. In this case, the four shortest basic pulses in the $H_{10}$ matrix may include:

$1/\sqrt{2} \times [1 \ -1]$ for 512 adaptive weights, (4)

$1/\sqrt{4} \times [1 \ 1 \ -1 \ -1]$ for 256 adaptive weights, (5)

$1/\sqrt{8} \times [1 \ 1 \ 1 \ 1 \ -1 \ -1 \ -1 \ -1]$ for 128 adaptive weights, (6)

$1/\sqrt{16} \times [1 \ 1 \ 1 \ 1 \ 1 \ 1 \ 1 \ 1 \ -1 \ -1 \ -1 \ -1 \ -1 \ -1 \ -1 \ -1]$ for 64 adaptive weights (7).

These vectors correspond to $\psi_{10}(t)$, $\psi_{20}(t)$, $\psi_{30}(t)$ and $\psi_{40}(t)$ in Equation (2). Each of these partial Haar transforms may potentially be employed. Often, the greater the number of adaptive coefficients or weights, the greater the accuracy of estimating the delay, while the greater the memory and computation.

The accuracy of modeling the impulse response may increase with increasing resolution of the partial Haar transform. However, the number of coefficients of the first adaptive filter may also increase with increasing resolution of the partial Haar transform. An increase in the number of coefficients may significantly increase the amount of memory in order to store the coefficients, as well as the amount of computation in order to adapt the coefficients. Thus, there may be a trade off or "sweet spot" for the optimum resolution of the partial Haar transform. It is difficult to place a definite circumference around the appropriate size of the partial Haar transform, since the appropriate size may vary significantly from one implementation to another. A relatively larger size may be employed to provide a more accurate representation or model of the impulse response, or a relatively smaller size may be employed to help reduce the amount of memory and computation.

This being said, the inventors have discovered that in many implementations it will often be appropriate to employ a partial Haar transform with a size in the range of about 1/64 to 1/4 the maximum size. For example, in the case of a 128 msec delay uncertainty, with an 8 kh sampling rate, an adaptive filter length of about 1024 coefficients may be employed for a single adaptive filter. However, in such a case, the first adaptive filter may have a substantially shorter length of about 64, 128, or 256 coefficients, rather than a full length of about 1024 coefficients. Accordingly, the filter employed to estimate the delay may be significantly shorter than the delay uncertainty of the impulse response. Such transforms may provide sufficient accuracy for estimating the delay while allowing the use of fewer filter coefficients in the first adaptive filter.

Thus, to summarize so far, in one embodiment of the invention, a partial Haar transform may be employed to transform the signal. The partial Haar transform may allow fast estimation of the delay of the impulse response, and has good resolution or estimation sensitivity in the time domain. The inventors have discovered that the speed and good resolution make the partial Haar transform well suited for estimating a delay of an impulse response of a sparse channel. In still other embodiments of the invention, a full Haar transform, or another partial or full wavelet transform may be employed. Numerous wavelet transforms, and their properties, are known in the signal processing arts. Often, it may be appropriate to employ a wavelet transform that is relatively fast to implement and that provides good resolution in the time domain, in order to allow efficient estimation of a delay associated with an impulse response.

Referring again to FIG. 3, the first adaptive filter 320 is in communication with the signal transformer 310 and may receive the transformed signal, $z(n)$. The first adaptive filter includes a plurality of filter coefficients that may be at least partially adapted based on the transformed signal. The number of adaptive filter coefficients may equal the number of basis functions in the partial Haar transform used to generate $z(n)$.

Conventional adaptive filtering algorithms that are well known in the echo cancellation arts may be employed to adapt the first filter. Suitable adaptive filtering algorithms include, but are not limited to, Least Mean Squares (LMS), Normalized LMS (NLMS), Recursive Least Square (RLS), and Affine Projection adaptive filtering algorithms. Also, other gradient decent adaptive filtering algorithms may also potentially be employed. Often, the selection of an algorithm may depend upon the spectral characteristics of the reception signal, and upon the amount of memory and computation that are appropriate for the particular implementation (e.g., some algorithms use relatively more memory and others use relatively more computation).

The adaptive filtering algorithm may adapt the filter coefficients through iterative comparison of a predicted echo and a signal including an actual echo. Notice in the illustrated echo canceller that the first adaptive filter 320 is in communication with the first adder 330. The first adaptive filter may provide a transformed echo replica signal 322 to the first adder. The transformed echo replica signal is a filtered signal that may represent a prediction of the echo due to the transformed signal, $z(n)$. The first adder may also receive the transmission signal, $d(n)$. In the field of echo cancellation, the transmission signal may include a near end signal, for example. The transmission signal may include information of interest, for example speech or data, as well as undesired echo, for example speech echo or data echo. It is not necessary to partial Haar transform the transmission signal in order to adapt the first filter.

The first adder may add or otherwise combine the transformed echo replica signal and the transmission signal. This may essentially remove the transformed echo replica signal, which may include the current prediction of the echo, from the actual echo of the transmission signal. The result is a transformed echo cancelled signal, $eh(n)$. The transformed echo cancelled signal may have a reduced amount of echo compared to the transmission signal. There is no requirement that the echo be completely cancelled. The transformed echo cancelled signal may be provided as feedback to the adaptive algorithm. The adaptive algorithm may then call for additional iterations or adaptation cycles in order to refine or further adapt the coefficients of the first filter. This may allow for improved echo cancellation. Generally, the transformed echo cancelled signal is not transmitted back along the communication link.

This describes an exemplary approach that may be employed to adapt the first filter. Now, more filter coefficients may generally more complete elimination of echo. Each adapted filter coefficient may allow elimination of a fraction of an echo over a particular period of time, for example 125 microseconds (μsec). Typically, since the precise timing of the echo is not known, a large number of filter coefficients have heretofore typically been employed in the filters of echo cancellers in order to provide echo cancellation over the longest expected period of impulse response delay. However, often a majority of these coefficients are zero or have negligible value, due to the sparseness of the channel. A potential problem with supporting these non-contributing coefficients is that they may imply more memory and computation.

The inventors have discovered that the first adaptive filter need not contain so many coefficients as traditionally employed. Rather, in one embodiment of the invention, the first filter may contain a lesser number of coefficients that is sufficient to allow estimation of a delay associated with an impulse response. Since the first filter does not have to eliminate the echo, but only estimate a delay, fewer coefficients may be employed. Fewer coefficients may be employed to achieve a relatively less accurate estimate of the delay or more coefficients may be employed to achieve a relatively more accurate estimate of the delay. Once the delay is estimated, for example by the delay estimator, it may be used to delay the reception signal, and allow relatively few coefficients of the second adaptive filter to eliminate the echo.

Additionally, numerous iterations are often required in traditional filter adaptation in order to completely adapt the filter coefficients in order to eliminate an echo. Often, thousands of iterations may be employed. So many iterations are not required in order to obtain satisfactory estimates of the delay of the impulse response. Simulations by the inventors indicate that often at least one and potentially two orders of magnitude fewer iterations may provide a suitable estimate of the delay. The simulations indicate that in the particular case of a two-sided exponential channel impulse response with 64 taps and a decay factor of 0.5, often about 1000 to 2000 iterations are needed in order to stabilize the filter coefficients, while less than 200, and often less than 100 iterations may be needed to stabilize the estimation of the delay. Even less iterations may be employed if a less accurate estimate is appropriate for the particular implementation. This may amount to a significant savings in computation for the first adaptive filter.

One potential drawback is that the partial Haar transform may slightly "smear" the reception signal x(n) by narrowing the bandwidth of the transformed signal, z(n), as compared to the bandwidth of the reception signal, x(n). The transformed signal, z(n), may include the dot product of x(n) and a Haar basis vector. The Haar basis vector may have length 4 (e.g., for 256 taps), 8 (128 taps) or 16 (64 taps). The Haar basis vector may narrow the bandwidth of z(n) as compared to that of x(n). This may make it somewhat more difficult to identify the peak of the impulse response. In cases, such as when the Haar basis functions are orthogonal to the impulse response, the result of the convolution may be close to zero. However, even in such extreme cases, it may be possible to obtain a reasonable estimate of the delay of the impulse response.

Referring again to FIG. 3, the delay estimator 340 is in communication with the first adaptive filter 320. The delay estimator may estimate a delay associated with an impulse response based on the adaptation of the first adaptive filter. In one embodiment of the invention, the delay may include a delay of a peak or other extremity associated with the impulse response. In estimating the delay, the delay estimator may first identify the peak or other extremity, and then determine the delay for the identified peak or other extremity. To identify the peak or other extremity, the delay estimator may access delay estimation information from the first adaptive filter. The delay estimation information may include one or more adapted filter coefficients. For example, in the case of identifying a peak, the delay estimator may access all of the adapted filter coefficients, which need not be completely adapted, and identify one or more relatively extreme or displaced filter coefficients. In one aspect, the delay estimator may identify a coefficient with the largest absolute value.

There are numerous different ways to identify extreme filter coefficients in an array of filter coefficients. In one embodiment of the invention, the delay estimator may identify a peak by identifying an adapted coefficient with the largest absolute value. In another embodiment of the invention, an adapted coefficient with the largest squared value may identify a peak. Alternatively, rather than using a single coefficient a plurality of coefficients may be used. For example, in one embodiment of the invention, a pair or other plurality of adapted coefficients with the largest mean absolute value, or the largest squared mean value, may be used to identify a peak. Gradients, derivatives, interpolation, other statistics, and other approaches known in the arts may also optionally be employed to estimate the delay of a peak or other extremity.

Now, as discussed above, it is not required that the adapted coefficients be completely adapted or converged. The inventors have discovered that significant reductions in computation may potentially be achieved by estimating the delay based on coefficients that are only partially adapted. While it is often the case that better estimates of the delay may be obtained with completely adapted coefficients, it may be appropriate to sacrifice a certain amount of accuracy in order to reduce the amount of computation and the time to estimate the delay. Often, adapting the coefficients over thousands of iterations is not required, and it may be sufficient to adapt the coefficients over tens, or hundreds of iterations.

In one aspect, the first filter may be adapted over a predetermined number of iterations, where the predetermined number is sufficient for estimating the peak. Alternatively, an adaptive approach may be employed in which the stabilization of the peak or other extremity may be tested for algorithmically. An exemplary test may determine, at any given iteration, whether the location, magnitude, or other characteristic of the peak is changing significantly, for example more than a threshold value. If "yes" is the determination, then it may be concluded that the peak is not sufficiently stabilized, and more iterations may be performed. Alternatively, if "no" is the determination, then it may be concluded that the peak is sufficiently stabilized, and the delay estimate may be generated based on the current estimate of the peak. Other approaches will be apparent to those skilled in the arts and having the benefit of the present disclosure.

Once the peak or other extremity is located, the delay associated with the located peak or other extremity may be easily determined. The coefficients of the filter may be arranged in a predetermined sequential order, with each of the coefficients corresponding to a unique period of time. The total period of time over which the filter may have an effect may be determined by multiplying the number of coefficients by the period of time over which a coefficient is effective. For example, if each coefficient of a 256-coefficient filter has a period of time of 100 µsec, then the filter may have an effect on echo cancellation over a period of time of 25,600 µsec. A first coefficient may cover the first 100 µsec, a second coefficient may cover the second 100 µsec, a third coefficient may cover the third 100 µsec, etc. Each particular coefficient may have, in a sense, a delay corresponding to the number of coefficients preceding that particular coefficient. Often, each coefficient has an effect over the same period of time, and one may speak simply of the number of the coefficient in the sequence, for example coefficient 250 out of 256.

Now, recall that the delay has been estimated based on the first adaptive filter adapting based on the transformed signal. As discussed, the transformed signal may have a different time resolution than the un-transformed signal. A time resolution conversion factor may be employed in order to convert the delay determined from the first adaptive filter into one that would be relevant for the second adaptive filter, which is to adapt based on the un-transformed signal. Let's consider an example in order to better illustrate the concepts. Assume a data block length of 1024, that the partial Haar transform of Equation (5) is employed to transform the signal, and that the first adaptive filter has a length of about 256-coefficients. Under these conditions, the time resolution of the transformed signal may be about one quarter that of the un-transformed signal. A time resolution conversion factor of 4 may be applied. For example, if first adaptive filter coefficient 250 corresponds to the peak of the impulse response for the transformed signal, then second adaptive filter coefficient 1000 (=4*250) may correspond to the peak of the impulse response on the un-tranformed signal. As another example, if the first adaptive filter has a length of 64-coefficients to cover the entire time domain, then a time resolution conversion factor of 16 may be applied. The delay estimator may perform this conversion.

Often, there is at least the possibility that the echo path characteristics may change over time. For example, in a telephony environment, a user may make a three-way call, which may alter the impedance mismatch, and alter the delay. In order to allow for changing impulse response, in one embodiment of the invention, the delay estimator may estimate or update the delay periodically. For example, the delay estimator may estimate the delay every 0.1 to 100 msec, or every 1 to 10 msec.

Referring again to FIG. 3, the second signal $x_2(n)$ may be provided to the delayer 350. The second signal may have substantially the same impulse response delay characteristics of the original reception signal.

The delayer may include a buffer, delay line, or other temporary data storage device to store and delay the second signal. Buffers may represent memories or other data storage devices that may store data until it is processed. Buffers are commonly employed in the digital communication arts in order to compensate for delays or differences in the rates of flow of information between devices or portions of devices. Buffers are often implemented in random access memory (RAM). Suitable types of RAM memory that may be employed include, but are not limited to, static-RAM (SRAM) and dynamic-RAM (DRAM). The buffer may include dedicated memory or software allocated general memory.

Alternatively, a delay line may be employed. A delay line may represent a circuit or other data flow path that may implement a delay. An exemplary delay line includes a shift register. Another exemplary delay line, although somewhat antiquated, includes a sequence of tubes of liquid mercury or other medium that may be used to delay digital pulses. Other temporary data storage devices known in the arts may also optionally be employed.

So, the delayer may receive the signal. The delayer is in communication with the delay estimator and may receive the estimate of the delay. It is an aspect of one embodiment of the invention that the delayer may delay the signal based on the estimate of the delay.

After the delay, at least a relevant portion of the delayed signal may be selected and provided to the second adaptive filter. The portion may be based on the estimated delay and based on the length of the second adaptive filter. In one embodiment of the invention, the portion may be substantially centered, aligned, or otherwise positioned about the estimated delay of the peak of the impulse response. This may also be viewed, at least conceptually, as centering, aligning, or otherwise positioning the second filter about the delay. The inventors have discovered that this may allow a significantly shorter second filter to be employed, especially in the case of a sparse channel. In the case of centering, about a first half of the coefficients may adapt based on a portion of the impulse response occurring prior to the peak, and about another half of the coefficients may be adapted based on another portion of the impulse response occurring after the peak. In one embodiment of the invention, the size of the portion of the delayed signal may include about as much of the delayed signal as the length of the second adaptive filter may model. For example, if a 256 coefficient second filter is employed about the equivalent of 256 coefficients worth of the delayed signal may be provided from the delayer to the second filter.

To further illustrate the concepts, let's consider an example. Assume a data block length of 1024, that the peak of the impulse response occurs at coefficient 500, and that the second filter has a length of 128-coefficients. Under such exemplary conditions, about 64 coefficients worth of delayed signal occurring prior to the peak, and about 64 coefficients worth of delayed signal occurring at or above the peak, may be selected and provided from the delayer to the second adaptive filter. Even though the second filter is relatively short, most of the coefficients are proximate the peak of the impulse response and are substantially relevant.

Now, as a result of estimating the delay of the impulse response, the second filter need not have a length that is as large as the delay uncertainty. Rather, the second filter may have a length that is based on or sufficient to model the longest expected span or duration of the impulse response about the estimated peak, which is typically much shorter. In essence, many of the negligible or zero-valued coefficients may be avoided, which may significantly reduce memory and computation, and increased conversion speed. In the case of a 1024-coefficient filter, the inventors have recognized that often only about 100-200 coefficients are significant. Accordingly, in various embodiments of the invention, the second filter may have a length that is about $1/16$ (e.g., $64/1024$) to $1/2$ (e.g., $512/1024$), or $1/8$ (e.g., $128/1024$) to $1/4$ (e.g., $256/1024$), the maximum size to model the uncertain impulse response including delay. The inventors have discovered that the approach may allow a reduction of the combined number of coefficients of the first and the second adaptive filters of up to about five as compared to a single adaptive filter being employed.

The second adaptive filter 360 is in communication with the delayer 350. The second adaptive filter may receive the delayed signal. As previously discussed, the delayed signal may include a relevant portion of the reception signal.

The second adaptive filter may be adapted based on the delayed signal. Conventional adaptive filtering algorithms that are well known in the echo cancellation arts may be employed to adapt the second filter. Suitable adaptive filtering algorithms include, but are not limited to, LMS, NLMS, RLS, and Affine Projection adaptive filtering algorithms. Also, other gradient decent adaptive filtering algorithms may also potentially be employed.

The adaptive filtering algorithm may adapt the filter coefficients through iteration based on a comparison of a predicted echo and a signal including an actual echo. Notice in the illustrated echo canceller that the second adaptive filter 360 is in communication with the second adder 370. The second adaptive filter may provide an echo replica signal 362 to the second adder. The echo replica signal is a filtered signal that may represent a prediction of the echo due to the reception signal, x(n). The second adder may also receive the transmission signal, d(n). In the field of echo cancellation, the transmission signal may include a near end signal, for example. The transmission signal may include information of interest, for example speech or data, as well as undesired echo, for example speech echo or data echo.

The second adder may add or otherwise combine the echo replica signal and the transmission signal. This may essentially remove the echo replica signal, which may include the current prediction of the echo, from the actual echo of the transmission signal. The result is an echo cancelled signal, e(n). The echo cancelled signal may have a reduced amount of echo compared to the transmission signal. There is no requirement that the echo be completely cancelled. The echo cancelled signal may be provided as feedback to the adaptive algorithm. The adaptive algorithm may then call for additional iterations or adaptation cycles in order to refine or further adapt the filter coefficients. This may allow for improved echo cancellation.

At some point, the echo cancelled signal may be provided to a communication link. The echo cancelled signal may have a reduced or cancelled echo relative to the transmission signal. A potential advantage of the method and apparatus disclosed above is that a first adaptive filter adapting on a transformed signal may be used to estimate an impulse response of a sparse channel, and then the estimate of the impulse response may be used to improve adaptation of a second adaptive filter.

Figure 4:
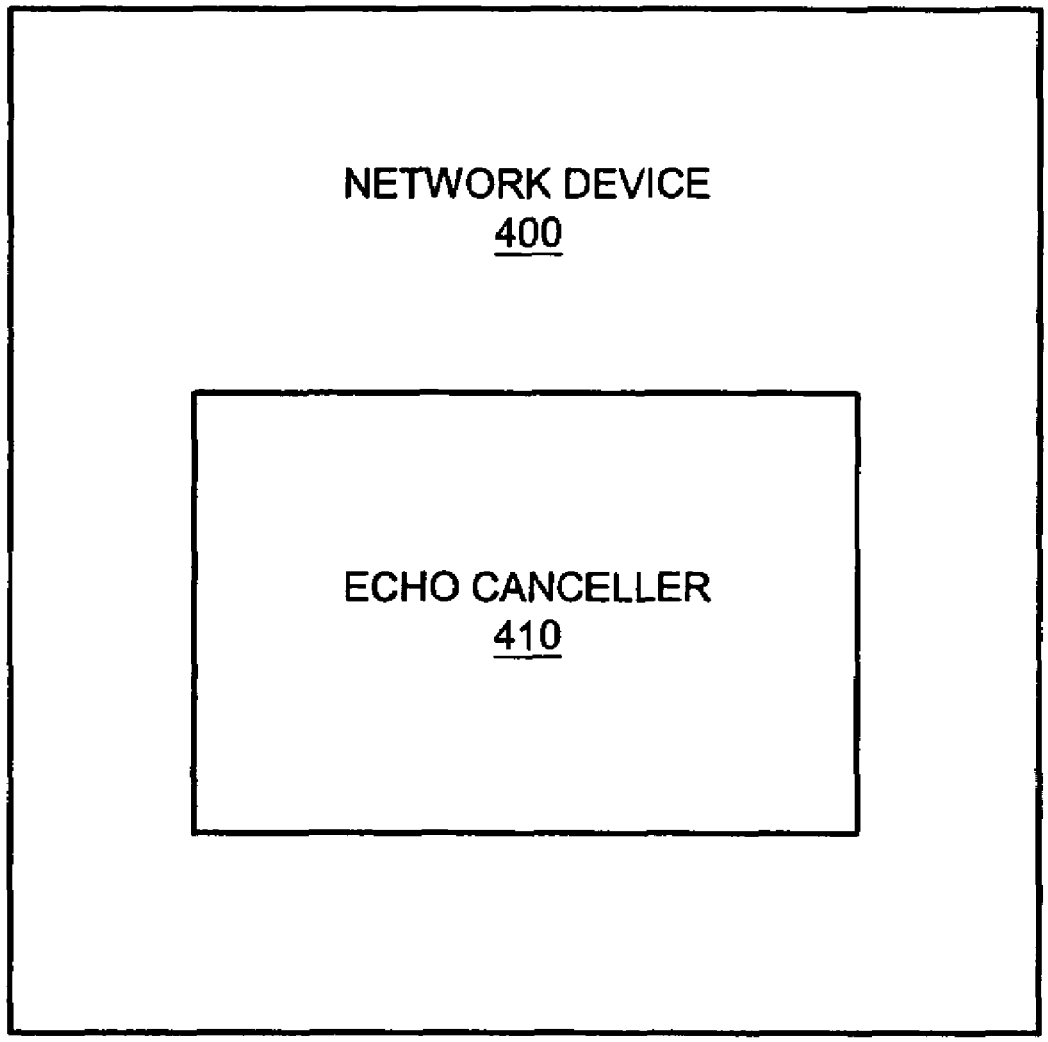
FIG. 4 is a block diagram of an exemplary network device in which an embodiment of the invention may be implemented.

FIG. 4 is a block diagram of an exemplary network device 400 in which an embodiment of the invention may be implemented. In various embodiments of the invention, the network device may include a modem, computer system, server, switch, gateway, bridge, hub, base station, satellite, telephony device, portable radio communication device, cell phone or the like. These devices, their components, and their methods of operation are well known in the arts. For example, it is well known that a switch or other network device may include a switch fabric. As another example, many of the network devices include one or more types of memory to store data. Different types of memory that are employed in some but not all network devices include static-RAM (SRAM), dynamic-RAM (DRAM), Flash, programmable ROM (PROM), and erasable-and-programmable ROM (EEPROM). The network device includes an echo canceller 410, according to one embodiment of the invention. In one embodiment of the invention, the echo canceller may utilize the one or more of these types of memory to delay or buffer a signal, although this is not required, and a dedicated memory or delay line within the echo canceller, may also optionally be employed.

Embodiments of the invention have been described primarily in the context of echo cancellation. However, embodiments of the invention are not limited to echo cancellation. Other channels and especially channels with sparse impulse response may potentially benefit from the systems and methods disclosed herein. For example, in one alternate embodiment of the invention, the methods and apparatus disclosed herein may be employed for sonar beam-forming applications when the uncertainty of the angle of arrival is very large compared to angular width of the target. Those skilled in the art and having the benefit of the present disclosure will appreciate that other embodiments may be employed in other sparse channel identification problems. Additionally, it is noted that while embodiments may be very useful for sparse channels, the invention is not limited to use in sparse channels.

In the description above, for the purposes of explanation, numerous specific details have been set forth in order to provide a thorough understanding of the embodiments of the invention. It will be apparent, however, to one skilled in the art, that other embodiments may be practiced without some of these specific details. In other instances, well-known circuits, structures, devices, and techniques have been shown in block diagram form or without detail in order not to obscure the understanding of this description.

An embodiment of the invention may include various operations. The operations of the embodiment may be performed by hardware components, or may be embodied in machine-executable instructions, which may be used to cause a general-purpose or special-purpose processor or logic circuits programmed with the instructions to perform the operations. Alternatively, the operations may be performed by a combination of hardware and software.

An embodiment of the invention may be provided as a program product or article of manufacture, which may include a machine-readable storage device or medium having stored thereon an instruction or instructions, which may be used to program a machine, such as a micro-electronic device, a microprocessor, an Application Specific Integrated Circuit (ASIC), a digital signal processor, a computer system, a switch, other network device, other machine, or other apparatus to perform a process. The storage medium may include, but is not limited to, floppy diskettes, optical disks, CD-ROMs, and magneto-optical disks, ROMs, RAMs, EPROMs, EEPROMs, magnet or optical cards, Flash memory, or other type of media/machine-readable medium suitable for storing electronic instructions. Moreover, an embodiment of the invention may also be downloaded as a computer program product, wherein the program may be transferred from one computer to another computer by way of data signals embodied in a carrier wave or other propagation medium via a communication link (e.g., a modem or network connection).

Many of the methods are described in their most basic form, but operations may be added to or deleted from the methods. It will be apparent to those skilled in the art that many further modifications and adaptations may be made. The particular embodiments are not provided to limit the invention but to illustrate it. The scope of the invention is not to be determined by the specific examples provided above but only by the claims below.

In the claims, any element that does not explicitly state "means for" performing a specified function, or "step for" performing a specified function, is not to be interpreted as a "means" or "step" clause as specified in 35 U.S.C. Section 112, Paragraph 6. In particular, the use of "step of" in the claims herein is not intended to invoke the provisions of 35 U.S.C. Section 112, Paragraph 6.

It should also be appreciated that reference throughout this specification to "one embodiment", or "an embodiment", or "in one aspect" means that a particular feature may be included in the practice of the invention. Similarly, it should be appreciated that in the foregoing description of exemplary embodiments of the invention, various features are sometimes grouped together in a single embodiment, Figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

While the invention has been described in terms of several embodiments, those skilled in the art will recognize that the invention is not limited to the embodiments described, but may be practiced with modification and alteration within the spirit and scope of the appended claims. The description is thus to be regarded as illustrative instead of limiting.

What is claimed is:

1. A method comprising:
   transforming a signal from a time domain to a transform domain with a partial wavelet transform;
   adapting a first adaptive filter in the transform domain based on the transformed signal;
   estimating a delay of an impulse response based on the adaptation of the first filter;
   delaying a signal based on the estimated delay; and
   adapting a second adaptive filter in the time domain based on the delayed signal.

2. The method of claim 1, wherein transforming the signal comprises transforming the signal with a partial Haar transform.

3. The method of claim 2, wherein the partial Haar transform comprises a subset of basis vectors that span a fill time range.

4. The method of claim 1, wherein estimating the delay comprises identifying one or more adapted coefficients of the first adaptive filter having extreme values relative to the other coefficients of the filter.

5. The method of claim 4, wherein estimating the delay comprises identifying an adapted coefficient having the largest absolute value.

6. The method of claim 1, wherein estimating the delay comprises transforming the estimate of the delay from the transform domain to the time domain.

7. The method of claim 1, further comprising reducing an echo based on the adaptation of the second adaptive filter.

8. An article comprising:
a storage medium comprising at least one of a floppy diskette, an optical disk, a CD-ROM, a magneto-optical disk, a ROM, a RAM, an EPROM, an EEPROM, a magnet card, an optical card, and a Flash memory, the storage medium having stored thereon data representing sequences of instructions that if executed cause an apparatus to:
transform a signal from a time domain to a transform domain with a partial wavelet transform;
adapt a first adaptive filter in the transform domain based on the transformed signal;
estimate a delay of an impulse response based on the adaptation of the first filter;
adapt a second adaptive filter in the time domain based on a signal that has been delayed based on the estimated delay.

9. The article of claim 8, wherein the instructions to transform further comprise instructions that if executed cause the apparatus to:
transform the signal with a partial Haar transform.

10. The article of claim 9, wherein the partial Haar transform comprises a subset of basis vectors that span a full time range.

11. The article of claim 8, wherein the instructions to estimate the delay further comprise instructions that if executed cause the apparatus to:
identify an adapted coefficient of the first adaptive filter having the largest absolute value.

12. The article of claim 8, wherein the instructions to estimate the delay further comprise instructions that if executed cause the apparatus to:
transform the estimate of the delay from the transform domain to the time domain.

13. The article of claim 8, wherein the instructions further comprise instructions that if executed cause the apparatus to:
reduce an echo based on the adaptation of the second adaptive filter.

14. An apparatus comprising:
a signal transformer to transform a signal in a time domain to a transformed signal in a transform domain with a partial transform;
a first adaptive filter in communication with the signal transformer, the first adaptive filter to adapt based on the transformed signal in the transform domain;
a delay estimator in communication with the first adaptive filter, the delay estimator to estimate a delay associated with an impulse response based on the adaptation of the first adaptive filter;
a delayer in communication with the delay estimator, the delayer to delay a signal in the time domain based on the estimate of the delay; and
a second adaptive filter in communication with the delayer, the second adaptive filter to adapt in the time domain based on the delayed signal.

15. The apparatus of claim 14, wherein the signal transformer comprises a wavelet transformer.

16. The apparatus of claim 15, wherein the signal transformer comprises a partial Haar transformer.

17. The apparatus of claim 16, wherein the partial Haar transformer comprises a subset of basis vectors that span a flu time range.

18. The apparatus of claim 14, wherein the delay estimator comprises a delay estimator to identify an adapted coefficient of the first adaptive filter having the largest absolute value.

19. The apparatus of claim 14, wherein the delayer comprises a delayer that is selected from the group consisting of a buffer and a delay line.

20. The apparatus of claim 14, wherein the first adaptive filter has 256 or fewer coefficients, and wherein a number of coefficients of the second adaptive filter is based on a longest expected impulse response for the channel.

21. The apparatus of claim 14, wherein the delayer comprises a delayer to delay the input signal so that the second adaptive filter is substantially centered about the estimate of the delay.

22. The apparatus of claim 14, implemented in a network device including a switch fabric.

23. The apparatus of claim 14, implemented in a network device including a DRAM memory.

24. An apparatus comprising:
a DRAM memory; and
an echo canceller, the echo canceller including:
a signal transformer to transform a signal in a time domain to a transformed signal in a transform domain;
a first adaptive filter in communication with the signal transformer, the first adaptive filter to adapt based on the transformed signal in the transform domain, wherein the first adaptive filter has less coefficients than a number of coefficients corresponding to a full transform of the signal by the signal transformer;
a delay estimator in communication with the first adaptive filter, the delay estimator to estimate a delay associated with an impulse response based on the adaptation of the first adaptive filter;
a delayer in communication with the delay estimator, the delayer to delay a signal in the time domain based on the estimate of the delay; and
a second adaptive filter in communication with the delayer, the second adaptive filter to adapt in the time domain based on the delayed signal.

25. The apparatus of claim 24, wherein the signal transformer comprises a partial Haar transformer.

26. The apparatus of claim 24, wherein the delay estimator comprises a delay estimator to identify one or more adapted coefficients of the first adaptive filter having extreme values relative to the other coefficients of the filter.

27. The apparatus of claim 24, further comprising a switch fabric.

* * * * *